(12) United States Patent
Lagsdin

(10) Patent No.: US 7,172,216 B1
(45) Date of Patent: Feb. 6, 2007

(54) STABILIZER PAD FOR VEHICLES

(76) Inventor: Andry Lagsdin, 54 King Hill Rd., Hanover, MA (US) 02339

( * ) Notice: Subject to any disclaimer, the term of this patent is extended or adjusted under 35 U.S.C. 154(b) by 0 days.

(21) Appl. No.: 11/285,236

(22) Filed: Nov. 22, 2005

(51) Int. Cl.
B60S 9/00 (2006.01)
(52) U.S. Cl. .................. 280/763.1; 411/400; 411/401; 403/408.1
(58) Field of Classification Search ............ 280/763.1, 280/764.1; 411/396, 398, 400, 401, 998; 403/408.1, 355, 356
See application file for complete search history.

(56) References Cited

U.S. PATENT DOCUMENTS

| 1,973,226 | A |   | 9/1934  | Rose et al. |
|-----------|---|---|---------|-------------|
| 2,277,939 | A |   | 3/1942  | Thalhammer |
| 2,388,658 | A | * | 11/1945 | Pumphrey .................. 411/401 |
| 2,411,629 | A | * | 11/1946 | Lane .......................... 411/400 |
| 3,219,362 | A |   | 11/1965 | Epstein |
| 3,244,301 | A |   | 4/1966  | Vaughan |
| 3,310,181 | A |   | 3/1967  | William |
| 3,495,727 | A |   | 2/1970  | Long |
| 3,642,242 | A |   | 2/1972  | Danekas |
| 3,721,458 | A | * | 3/1973  | Mitchell .................. 280/764.1 |
| 3,754,777 | A |   | 8/1973  | Riggs et al. |
| 3,758,154 | A |   | 9/1973  | Kitaguchi |
| 3,831,774 | A |   | 8/1974  | Moore |
| 3,881,692 | A |   | 5/1975  | Clarke |
| 3,897,079 | A |   | 7/1975  | MacKenzie et al. |
| 3,913,942 | A |   | 10/1975 | MacKenzie et al. |
| 3,924,876 | A |   | 12/1975 | Vaillant et al. |
| 3,930,668 | A |   | 1/1976  | Schuerman et al. |
| 3,945,666 | A |   | 3/1976  | Fritsch |
| 3,976,306 | A |   | 8/1976  | Nault |
| 3,990,714 | A |   | 11/1976 | Hornagold |
| 3,998,470 | A |   | 12/1976 | Houston |
| 4,023,828 | A |   | 5/1977  | MacKenzie et al. |
| 4,039,206 | A |   | 8/1977  | Nault |
| 4,066,234 | A |   | 1/1978  | Nycum |
| 4,073,454 | A |   | 2/1978  | Sauber |
| 4,201,137 | A |   | 5/1980  | Lagsdin |
| 4,204,714 | A |   | 5/1980  | Jacobson et al. |
| 4,266,809 | A |   | 5/1981  | Wuerflein |
| 4,397,479 | A |   | 8/1983  | Schmidt |
| 4,421,290 | A | * | 12/1983 | Frank ......................... 248/558 |
| 4,473,239 | A |   | 9/1984  | Smart |
| 4,515,520 | A |   | 5/1985  | Parquet et al. |
| 4,531,883 | A |   | 7/1985  | Arnold |
| 4,546,996 | A |   | 10/1985 | Hanson |

(Continued)

FOREIGN PATENT DOCUMENTS

CA          492912          5/1953

(Continued)

Primary Examiner—Christopher P. Ellis
Assistant Examiner—John Walters
(74) Attorney, Agent, or Firm—David M. Driscoll, Esq.

(57) ABSTRACT

A stabilizer pad apparatus including a metal frame for attachment to a stabilizer arm and a resilient pad supported in the pocket of the frame and including a clamping plate to hold the resilient pad in the pocket. The metal frame has sidewalls forming a pocket for receiving the resilient pad. At least one elongated securing member extends through the resilient pad having one end secured at one sidewall of the frame and having another head end disposed at the other sidewall of the frame. The head end has a non-circular shape that is accommodated in a like shaped aperture in the other sidewall.

25 Claims, 4 Drawing Sheets

U.S. PATENT DOCUMENTS

| | | |
|---|---|---|
| 4,619,369 A | 10/1986 | Mertens |
| 4,761,021 A | 8/1988 | Lagsdin |
| 4,860,539 A | 8/1989 | Parrett et al. |
| 4,889,362 A | 12/1989 | Lagsdin |
| 5,011,184 A | 4/1991 | Loudon |
| 5,015,008 A | 5/1991 | Schupback |
| 5,050,904 A | 9/1991 | Lagsdin |
| 5,051,057 A | 9/1991 | Kremer |
| 5,054,812 A | 10/1991 | Lagsdin |
| 5,154,255 A | 10/1992 | Kista et al. |
| 5,310,217 A | 5/1994 | Paskey et al. |
| 5,338,255 A | 8/1994 | Akehurst |
| 5,466,004 A | 11/1995 | Lagsdin |
| 5,488,788 A | 2/1996 | Durbin |
| 5,547,220 A | 8/1996 | Lagsdin |
| 5,564,871 A | 10/1996 | Lagsdin |
| 5,667,245 A | 9/1997 | Lagsdin |
| 5,730,455 A | 3/1998 | Varnum, Sr. et al. |
| 5,957,496 A | 9/1999 | Lagsdin |
| 5,992,883 A | 11/1999 | Lagsdin |
| 6,109,650 A | 8/2000 | Lagsdin |
| 6,270,119 B1 | 8/2001 | Lagsdin |
| 6,651,989 B2 * | 11/2003 | Johnson .................. 277/598 |

FOREIGN PATENT DOCUMENTS

| | | |
|---|---|---|
| CA | 1029715 | 4/1978 |
| CA | 1036148 | 8/1978 |

* cited by examiner

STABILIZER PAD FOR VEHICLES

FIELD OF THE INVENTION

The present invention relates to a stabilizer pad for vehicles. More particular, the invention pertains to means for securing said pad for maximum tightening. Also the invention pertains to a means for allowing said pad to be reversible.

BACKGROUND OF THE INVENTION

My U.S. patent application publication No. 2004/0178617 describes various types of stabilizer pad constructions including resilient pads that are reversible. An objective of the present invention is to provide a simplified pad structure in which the resilient member can be easily secured in place and yet can be readily dismounted from the weldment.

Another object of the present invention is to provide an improved stabilizer pad for a backhoe or the like and in which means are used for securing the resilient pad in the weldment, while at the same time securing together the layers that comprise the resilient pad.

A further object of the present invention is to provide an improved stabilizer pad that is well adapted for use either as a reversible resilient pad or a non-reversible resilient pad.

Still another object of the present invention is to provide an improved stabilizer pad that is not complex in structure, that is easily assembled and dis-assembled and that can be manufactured inexpensively.

SUMMARY OF THE INVENTION

In accordance with the present invention there is provided a stabilizer pad apparatus that includes a metal weldment for attachment to a stabilizer arm, a resilient pad supported in the weldment, and means for securing the resilient pad in the weldment including at least a pair of bolts that extend through the pad and the metal weldment. The proximal end of each bolt is turned to form a bend that is received in a non-circular slot in a sidewall of the weldment.

In accordance with other aspects of the present invention, the metal weldment may be attached to a stabilizer arm via flanges and may have a plurality of sidewalls downwardly depending from a top; one of the sidewalls may have at least two oblong, oval or elongated slots for receiving the proximal ends of respective bolts; and another one of the sidewalls may have at least one slot for receiving the distal end of the bolts. The resilient pad may be a laminated pad comprised of multiple layers or alternatively the resilient pad may be a molded rubber pad. The laminated pad may have at least two holes, at least one hole for receiving means for securing the laminated pad together and another hole for receiving the bolt; and may have passages that are midway so that the pad is reversible. The bend in the bolt may form a flat end that is urged against a clamping plate which may have at least two slots small enough to enable the bolt to pass through without having the turned end pass through. The distal end of the bolts may be threaded and may be fastened using washers and nuts.

In accordance with another embodiment of the present invention there is provided a stabilizer pad apparatus that includes a metal frame for attachment to a stabilizer arm, wherein the metal frame has sidewalls forming a pocket; a resilient pad supported in the pocket of the frame and including a clamping plate to hold the resilient pad in the pocket; and at least one elongated securing member that extends through the resilient pad having one end secured at one sidewall of the frame and having another head end disposed at the other sidewall of the frame. The head end has a non-circular shape that is accommodated in a like shaped aperture in the other sidewall.

In accordance with other aspects of the present invention, the resilient pad is one of a laminated pad comprised of multiple layers and a single piece molded pad; the resilient pad may be a laminated pad and has at least two holes, at least one hole for receiving means for securing the laminated pad together and another hole for receiving the securing member; and the head end may has a base surface that is urged against the clamping plate. The stabilizer pad apparatus may include plural securing members and the clamping plate may have at least two holes therein enabling a shaft of each securing member to pass therethrough; the securing member may have a threaded end for receiving at least a securing nut; the metal frame may be attached to the stabilizer arm via a pair of flanges. The resilient pad may have opposite ground-engaging surfaces and passages for receiving the securing members so that the pad is reversible. The head end is may be sufficiently deep to extend beyond the sidewall and is dimensioned to prevent the head end from passing through the clamping plate and the like-shaped aperture is preferably used to prevents rotation of the head end.

BRIEF DESCRIPTION OF THE DRAWINGS

Numerous other objects, features and advantages of the present invention are now realized by a reading of the following detailed description taken in conjunction with the accompanying drawings, in which.

DETAILED DESCRIPTION OF THE INVENTION

Figure 6:
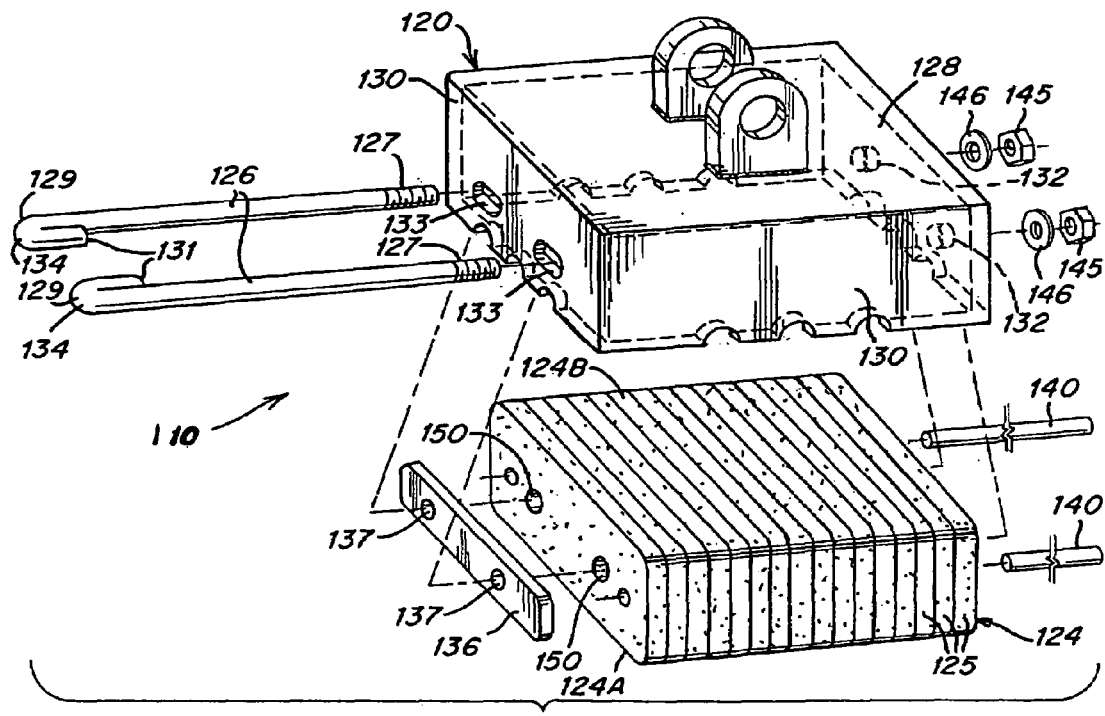
FIG. 6 is an exploded perspective view of a second embodiment of a stabilizer pad in accordance with the present invention and in which the resilient pad is reversible.
Figures 7, 8:
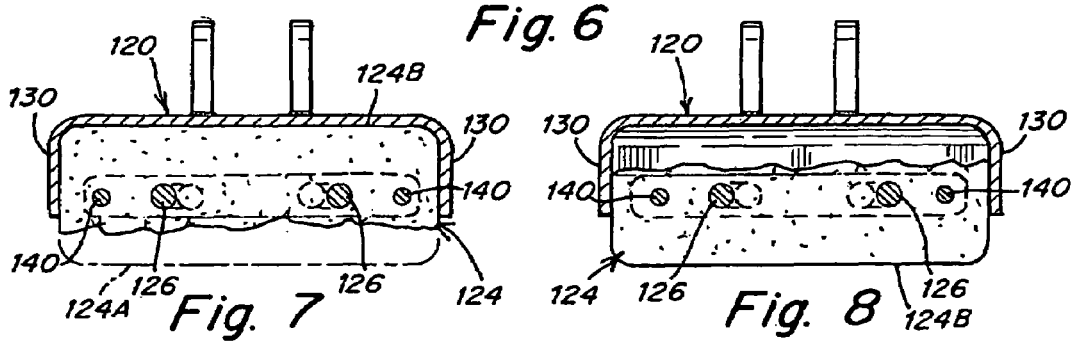
FIG. 7 is a schematic cross-sectional view of the pad of FIG. 6 illustrating the resilient pad worn on one side.
FIG. 8 is a schematic cross-sectional view like that shown in FIG. 7 but with the worn pad reversed.
Figure 9:
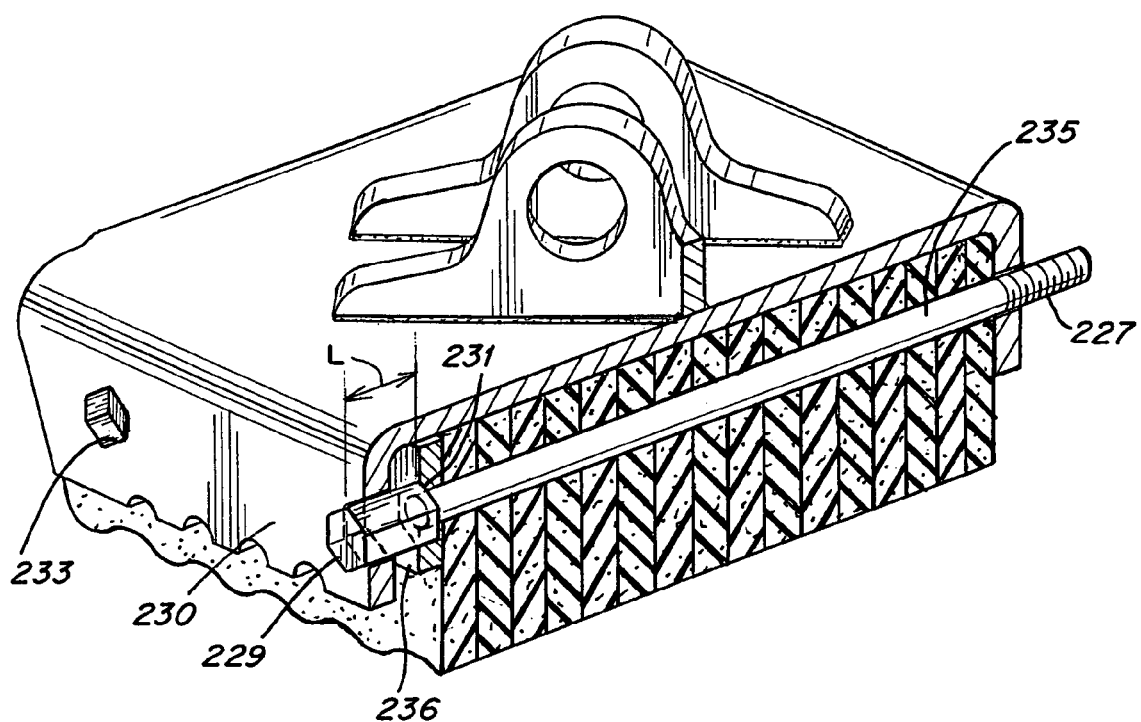
FIG. 9 is a partial cut-away perspective view of a third embodiment of the stabilizer pad of the present invention.

Referring now to the drawings, a first embodiment of the invention is illustrated in FIGS. 1–5. In this embodiment of the invention the resilient laminate is not considered as reversible. A second embodiment of the invention is illustrated in FIGS. 6–8 in which the pad support is similar to that described in the first embodiment, however, in this second embodiment the resilient laminate is reversible so that both sides thereof can be selectively used. A third embodiment of the present invention is illustrated in FIG. 9 using a different form of securing member.

Figure 1:
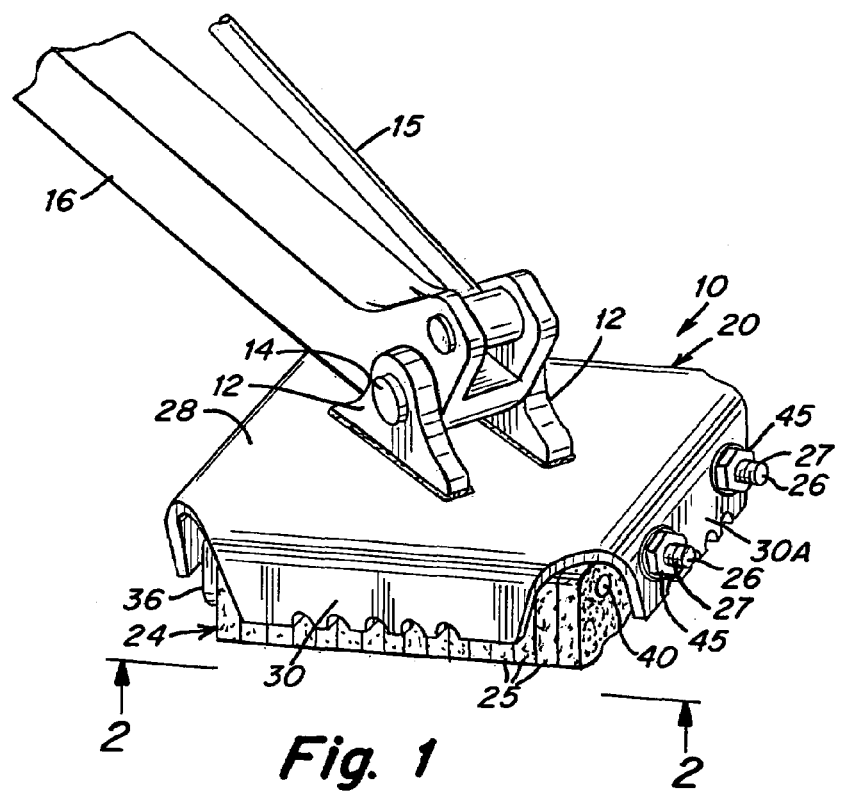
FIG. 1 is a perspective view of a first embodiment of the stabilizer pad of the present invention shown as attached to a stabilizer arm.

FIG. 1 is a perspective view of a first embodiment of a stabilizer pad 10 constructed in accordance with the principals of the present invention. In FIG. 1 the stabilizer pad 10 is illustrated as connected to a stabilizer arm 16 of a typical loader/backhoe. The loader/backhoe is supported on a pair of stabilizer arms, however, for the sake of simplicity, only one stabilizer arm and associated pad is disclosed herein. The stabilizer pad 10 is attached to the distal end of the stabilizer arm 16 by means of a pair of flanges 12 and an inter-connecting pin 14. The flanges 12 are disposed in a spaced relationship and may be welded to the top surface of the stabilizer pad 10 or attached in another appropriate manner.

A hydraulic piston 15 is typically used to operate the stabilizer arm 16. In FIG. 1, the stabilizer arm 16 is illustrated in an operational, extended position in which the stabilizer pad 10 is in engagement with a ground surface to prevent movement of the backhoe during its operation. When the backhoe is to be moved, the pistons 15 associated with each stabilizer arm 16 can be actuated to pivot and raise the stabilizer arm 10 above ground level.

Figure 2:
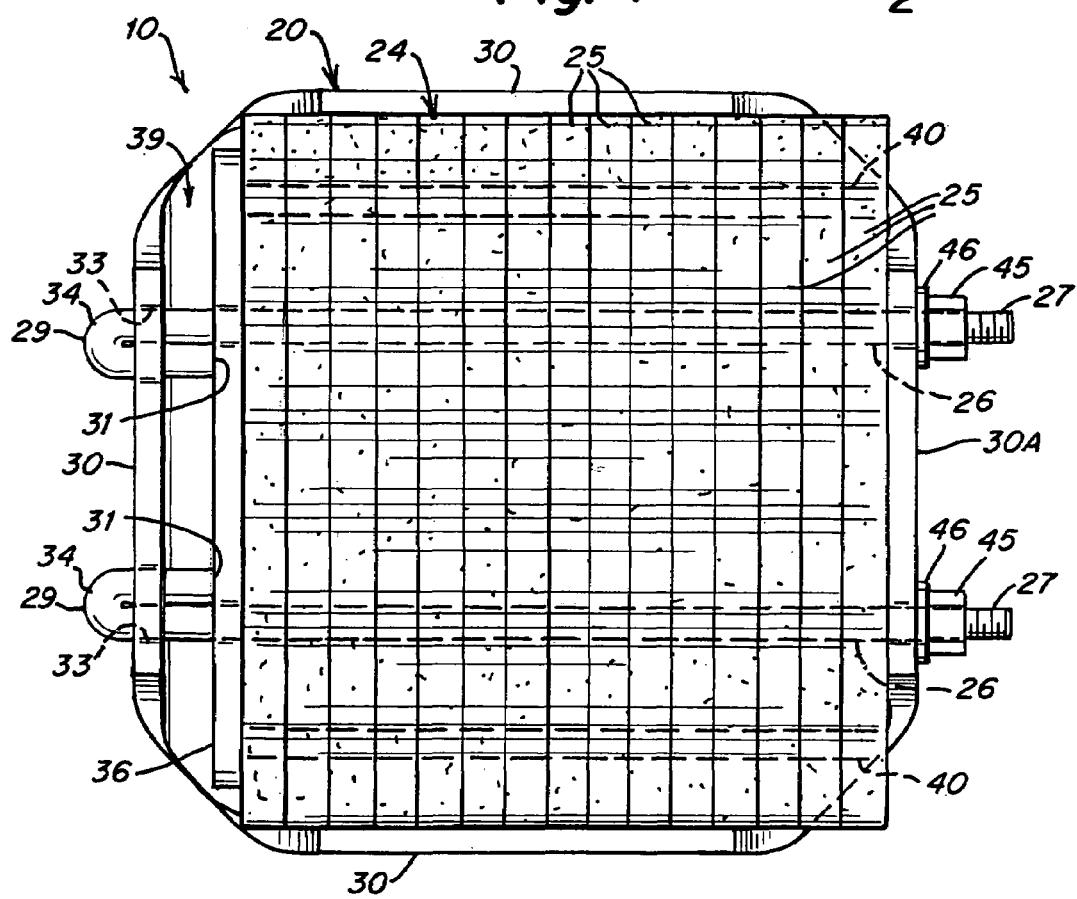
FIG. 2 is a bottom view as taken along line 2—2 of FIG. 1.
Figure 3:
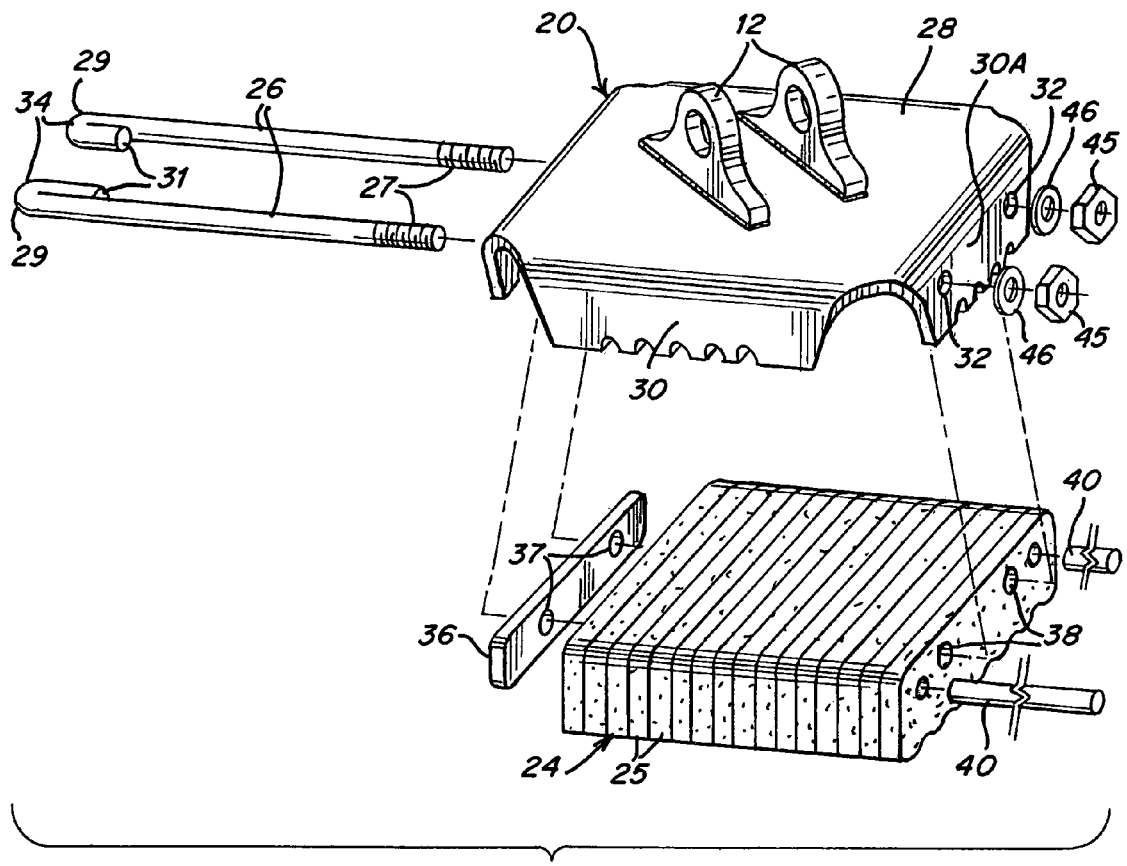
FIG. 3 is an exploded perspective view of the stabilizer pad of FIG. 1.

As illustrated in further detail in FIGS. 2–5, the stabilizer pad 10 is basically comprised of a metal weldment 20, resilient laminate 24 and securing bolts 26. The metal weldment 20 includes a top 28 and four downwardly depending sidewalls 30 that are integrally formed with the top 28. This top and wall structure forms a pocket for receiving the resilient laminate pad 24. One sidewall 30A is also provided with a pair of spaced holes 32 for receiving the securing bolts 26. Refer to FIGS. 1–3 wherein the thread end of each bolt extends through a respective hole 32.

Although the drawings illustrate the use of a pair of bolts, in accordance with the invention any number of bolts may be provided, including even a single bolt. However, it is preferred to have at least two spaced-apart bolts for effectively securing the resilient pad in place. Also, although particularly shaped bolts are depicted in FIGS. 1–5, it is understood that the scope of the present invention also covers a wide variety of other types of securing members, such as ones depicted hereinafter.

The resilient laminate 24 is constructed of a plurality of individual resilient laminate layers 25. The layers 25 are preferably constructed of a durable rubber material. For example, the layers 25 may be constructed from sidewall segments of truck tire carcasses or from rubber conveyor belts, both of which have been found to provide the desired flexibility, surface friction, and wearability. Although, in a preferred embodiment, the stabilizer pad is a laminated pad, it may also be formed as a single piece molded rubber pad.

As depicted in FIG. 3, there is associated with the resilient laminate 24 a clamping plate 36. The clamping plate 36 is provided with a pair of holes 37 that correspond in position to holes 38 that extend through all layers of the resilient laminate 24. The bolts 26 are adapted to pass through holes 37 and 38 as described hereinafter. The layers 25 of the laminate 24 may be supported solely by the bolts 26. However, it is preferred that the individual layers 25 be secured together in an appropriate manner even before the bolts are secured. For example, the layers 25 can be attached together with the use of an adhesive. Preferably the layers 25 are secured by means of at least two pins 40 (see FIGS. 3 and 5) that may be force-fit into accommodating holes in the individual laminate layers. For example, refer to my earlier U.S. publication No. 2004/0178617 and in particular FIGS. 51–53, 59, 75 and 78 for illustrations of means for holding laminate layers together.

The following U.S. Patent Application Publications 2004/0046378; 2004/0056465 and 2004/0178617 are hereby incorporated by reference in their entirety.

Figure 4:
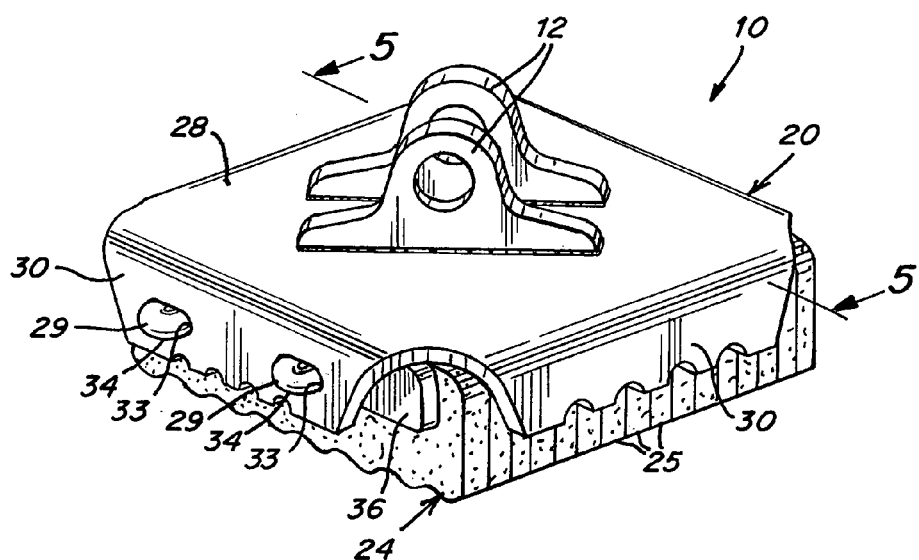
FIG. 4 is a perspective view of the first embodiment rotated 90 degrees from the view of FIG. 1.

The bolts 26 are constructed and arranged in a manner to secure the resilient laminate 24 within the metal weldment 20. In addition, the bolts 26 are configured to firmly engage and clamp the resilient laminate with the assistance of the clamping plate 36. The distal end of each bolt 26 is threaded at 27 to receive the corresponding nut 45 and washer 46 once the pad is in position, such as depicted in FIGS. 1 and 4. The proximal end 29 of each bolt 26 is turned 180° to form a U-shaped bend 34 having a flat end 31 that is adapted to be urged and thus clamp against the clamping plate 36. Refer to FIG. 2 for an illustration of the end 31 urged against the side of the clamping plate 36. The U-shaped bend 34 fits within the slot 33. The slot 33 is non-circular, oblong, oval or elongated in shape and when the bolt 26 is in position, such as illustrated in FIG. 4, the bolt is prevented from rotation but can be tightened by the nuts 45. This tightening clamps the flat end 31 against the side of the clamping plate 36 which, in turn, firmly clamps all of the layers of the laminate together. FIG. 2 illustrates the position of the bolts 26 in their slots 33 and the clamping of the clamping plate 36.

Figure 5:
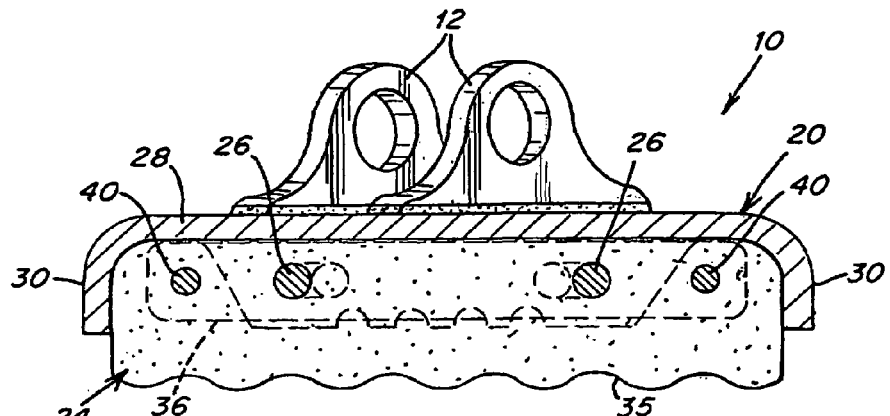
FIG. 5 is a cross-sectional view as taken along line 5—5 of FIG. 4.

FIG. 5 illustrates a cross-section through the stabilizer pad and furthermore illustrates the position of the bolts 26 relative to the thickness of the laminate. The optional securing pins 40 are also shown. In this particulate embodiment, the resilient laminate is not meant to be reversed. In the embodiment illustrated in FIG. 5 it is also noted that the ground contact of the surface has a waved or uneven configuration at 35 to assist in its gripping action.

In this first embodiment the resilient pad 24 can be replaced as needed by simply un-tightening nuts 45, sliding out bolts 26, removing the resilient pad 24, and replacing it with a new resilient pad. The bolts 26 are simply slid back in place and tightened with washers 46 and nuts 45. Because of the configuration of particularly the head of the securing bolts one need only tighten on the nuts as the bolt is prevented from rotating by virtue of the engagement between the bolt head and sidewall of the weldment or frame. To assist in replacing the resilient pad it is also preferred that there be left some small space between the sidewall and clamping plate. This illustrated in FIG. 2 by the space 39.

FIGS. 6–8 illustrate a second embodiment of the present invention, in which the stabilizer pad 124 is considered to be reversible so that both sides 124A and 124B of the stabilizer pad can be used. As illustrated in further detail in FIGS. 6–8, the stabilizer pad assembly 110 is basically comprised of a metal weldment 120, resilient laminate 124 and securing bolts 126. The metal weldment 120 includes atop 128 and four downwardly depending sidewalls 130 that are integrally formed with the top 128. This structure forms a pocket for receiving the resilient laminate 124. Opposite sidewalls are also provided, on one side with a pair of holes 132 and, on the other side with a pair of aligned slots 133 for receiving the head of each securing bolt 126.

Although the drawings illustrate the use of a pair of bolts, in accordance with the invention any number of bolts may be provided, including even a single bolt. However, it is preferred to have at least two spaced-apart bolts for securing the resilient pad in place.

The resilient laminate pad 124 is constructed of a plurality of individual resilient laminate layers 125. The layers 125 are preferably constructed of a durable rubber material. For example, the layers 125 may be constructed from sidewall segments of truck tire carcasses or from rubber conveyor belts, both of which have been found to provide the desired flexibility, surface friction, and wearability. Although, in a preferred embodiment, the stabilizer pad is a laminated pad, it may also be formed as a single piece molded rubber pad. As depicted in FIG. 6, there is associated with the resilient laminate pad 124 a clamping plate 136. The clamping plate 136 is provided with a pair of holes 137 that correspond in position to holes 150 that extend through all layers of the resilient laminate 124. The bolts 126 are adapted to pass through holes 137 and 150 as described hereinafter.

The layers 125 of the laminate 124 may be supported solely by the bolts 126. However, it is preferred that the individual layers 125 be secured together in an appropriate manner even before the bolts are secured. For example, the layers 125 can be attached together with the use of an adhesive. Preferably the layers 125 are secured by means of at least two pins 140 that may be force-fit into accommodating holes in the individual laminate layers. For example, refer to my earlier U.S. publication No. 2004/0178617 and in particular FIGS. 51–53, 59, 75 and 78 for illustrations of means for holding laminate layers together.

The bolts 126 are constructed in a manner to secure the resilient laminate 124 within the metal weldment 120. In addition, the bolts 126 are configured to firmly engage and clamp the resilient laminate with the assistance of the clamping plate 136. The distal end of each bolt 126 is threaded at 127 to receive the corresponding nut 145 and washer 146. The proximal end 129 of each bolt 126 is turned 180° to form a U-shaped bend 134 having a flat end 131 that is adapted to clamp against the clamping plate 136. The U-shaped bend 134 fits within the slot 133 in a similar manner to that depicted in the first embodiment described herein. The slot 133 is non-circular, oblong, oval or elongated in shape and when the bolt 126 is in position, such as illustrated in FIG. 4, the bolt is prevented from rotation but can be tightened by the nuts 145. This tightening clamps the flat end 131 against the side of the clamping plate 136 which, in turn, clamps all of the layers of the laminate together. FIG. 2 illustrates the position of the bolts in their slots and the clamping of the clamping plate.

FIGS. 6 and 7 illustrate a cross-section through the stabilizer pad and furthermore illustrate the position of the bolts 126 relative to the thickness of the laminate. In this particulate embodiment, the resilient laminate is meant to be reversed so that both sides of the laminate can be used. To use both sides of the resilient laminate 124, the nuts 145 simply need to be un-tightened, bolts 126 slid out, and the laminate 124 can be removed, reversed, and replaced. Then bolts 126 are be slid back into position and fastened with washers 146 and nuts 145.

FIG. 7 illustrates the position of the resilient pad prior to it being reversed. It is noted that in that position the side 124A of the pad has become worn. FIG. 8 illustrates the same pad having been reversed 180°. In FIG. 8 it is noted that the ground contact surface is now the opposite sides surface 124B that has yet to be used. The worn side of the pad in FIG. 8 is now disposed within the weldment. Additionally, when the pad is in the position in FIG. 8 a separate spacer (not shown) may be used above the resilient pad to fill the space between the resilient pad and the weldment. Also, a heavier strength (diameter) bolt may be used so as to provide proper structural support for the pad.

Although the first embodiment describes the securing bolt with a turned end, other shapes and configurations of bolts or securing means may be used as long as they are of a non-circular shape. For example, even a bolt with a hex head can be employed with a corresponding hex-shaped slot in the weldment. In that instance, the head is sufficiently deep to perform the clamping function with the clamping plate.

FIG. 9 is a fragmentary perspective view of the hex-head arrangement. The bolt includes a non-circular head 229, a bolt shaft 235 and a threaded end 227. The threaded end receives a nut in the same manner as described in FIG. 2. The non-circular head 229 has a sufficiently deep dimension 'L' that is greater than the distance between wall 230 and clamping plate 236 so that the head extends beyond wall 230 in the fully-tightened position of the bolt. The head of the bolt 229 is accommodated in a like-shaped slot 233 in the sidewall 230 so as to prevent rotation of the head 229 as the nut at the opposite end is tightened. In comparison to the first embodiment where there is only contact at one side of the bolt with the clamping plate, this second embodiment has contact between the hex-head and the clamping plate about the entire bolts shaft. This is depicted in FIG. 9 at annular contact surface 231.

Having thus described particular embodiments of the invention, various alterations, modifications and improvements will readily occur to those skilled in the art. Such alterations, modifications and improvement as are made obvious by this disclosure are intended to be apart of this description though not expressly stated herein, and are intended to be within the spirit and scope of the invention. Accordingly, the foregoing description is by way of example only, and not limiting. The invention is limited only as defined in the following claims and equivalents hereto.

What is claimed is:

1. A stabilizer pad apparatus comprising:
   a metal weldment for attachment to a stabilizer arm;
   a resilient pad supported in said weldment;
   means for securing the resilient pad in said weldment including at least a pair of bolts that extend through said resilient pad and said metal weldment;
   the head end of each said bolt turned to form a bend that defines a contact face and that is received in a non-circular slot in a sidewall of said weldment;
   and a clamping plate spacedly disposed from said sidewall; said bolt, upon tightening, clamping the contact face thereof against said clamping plate.

2. A stabilizer pad apparatus as claimed in claim 1 wherein said metal weldment has a plurality of sidewalls downwardly depending from a top and forming a pocket for receiving said resilient pad therein.

3. A stabilizer pad apparatus as claimed in claim 1 wherein said bolt passes through a hole in said clamping plate.

4. A stabilizer pad apparatus as claimed in claim 1 wherein the resilient pad is one of a laminated pad comprised of multiple layers and single piece molded pad.

5. A stabilizer pad apparatus as claimed in claim 1 wherein said resilient pad is a laminated pad and has at least two holes, at least one hole for receiving means for securing the laminated pad together and another hole for receiving said bolt.

6. A stabilizer pad apparatus as claimed in claim 1 wherein said clamping plate has at least two holes small enough to enable said bolt to pass through without having said turned end pass through.

7. A stabilizer pad apparatus as claimed in claim 1 wherein said bolts have a threaded end for receiving at least a securing nut.

8. A stabilizer pad apparatus as claimed in claim 1 wherein said metal weldment is attached to a stabilizer arm via flanges.

9. A stabilizer pad apparatus as claimed in claim 1 wherein said resilient pad has passages for receiving the bolts and that are midway so that the pad is reversible.

10. A stabilizer pad apparatus comprising:

a metal frame for attachment to a stabilizer arm;

said metal frame having sidewalls forming a pocket;

a resilient pad supported in the pocket of said frame and including a clamping plate to hold the resilient pad in the pocket;

and at least one elongated securing member that extends through said resilient pad having one end secured at one sidewall of the frame and having another head end disposed at the other sidewall of the frame;

said head end having a non-circular shape that is accommodated in a like shaped aperture in said other sidewall and further including a flat end that contacts said clamping plate.

11. A stabilizer pad apparatus as claimed in claim 10 wherein the resilient pad is one of a laminated pad comprised of multiple layers and a single piece molded pad.

12. A stabilizer pad apparatus as claimed in claim 10 wherein said resilient pad is a laminated pad and has at least two holes, at least one hole for receiving means for securing the laminated pad together and another hole for receiving said securing member.

13. A stabilizer pad apparatus as claimed in claim 10 wherein said flat end is directed toward said one sidewall.

14. A stabilizer pad apparatus as claimed in claim 13 including plural securing members and wherein said clamping plate has at least two holes therein enabling a shaft of each securing member to pass therethrough.

15. A stabilizer pad apparatus as claimed in claim 10 wherein said securing member has a threaded end for receiving at least a securing nut.

16. A stabilizer pad apparatus as claimed in claim 10 wherein said metal frame is attached to the stabilizer arm via a pair of flanges.

17. A stabilizer pad apparatus as claimed in claim 10 wherein said resilient pad has opposite ground-engaging surfaces and passages for receiving the securing members so that the pad is reversible.

18. A stabilizer pad apparatus as claimed in claim 10 wherein said head end is sufficiently deep to extend beyond said other sidewall and is dimensioned to prevent the head end from passing through the clamping plate.

19. A stabilizer pad apparatus as claimed in claim 10 wherein said like-shaped aperture prevents rotation of said head end.

20. A stabilizer pad apparatus comprising:

a metal frame for attachment to a stabilizer arm;

said metal frame having sidewalls forming a pocket;

a resilient pad supported in the pocket of said frame and including a clamping plate to hold the resilient pad in the pocket;

and at least a pair of spacedly disposed elongated securing member that extends through said resilient pad having one end secured at one sidewall of the frame and having another head end disposed at the other sidewall of the frame;

said head end including a non-circular polyhedron with at least three sides that is accommodated in a like shaped non-circular aperture in said other sidewall, said head end further including a contact end that faces toward the one sidewall for engagement with said clamping plate.

21. A stabilizer pad apparatus as claimed in claim 20 wherein said polyhedron has symmetric sides.

22. A stabilizer pad apparatus as claimed in claim 21 wherein said securing member also includes a cylindrical shaft and said head engages the pad about the entire shaft.

23. A stabilizer pad apparatus comprising:

a metal weldment for attachment to a stabilizer arm;

a resilient pad supported in said weldment;

and at least one elongated bolt that extends through said resilient pad having one end secured at one sidewall of the weldment and having another head end disposed at the other sidewall of the weldment;

said other sidewall of the weldment having a non-circular aperture;

said head end including a first portion that interlocks with said aperture and a second portion that defines a contact end facing said one sidewall and engageable with said resilient pad.

24. A stabilizer pad apparatus as claimed in claim 23 further including a clamping plate disposed against said resilient pad, the contact end of the second portion engaging the clamping plate.

25. A stabilizer pad apparatus as claimed in claim 24 wherein said clamping plate is spacedly disposed from said other sidewall.

* * * * *